(12) United States Patent
Dommety et al.

(10) Patent No.: US 6,510,144 B1
(45) Date of Patent: Jan. 21, 2003

(54) NETWORK LAYER SUPPORT TO ENHANCE THE TRANSPORT LAYER PERFORMANCE IN MOBILE AND WIRELESS ENVIRONMENTS

(75) Inventors: Gopal K. Dommety, Santa Clara, CA (US); Kent K. Leung, Mountain View, CA (US); Roy Laurens, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/457,041

(22) Filed: Dec. 7, 1999

(51) Int. Cl.$^7$ .................................................. H04J 3/16
(52) U.S. Cl. ...................... 370/328; 370/409; 370/410; 709/238
(58) Field of Search ................................ 370/328, 329, 370/331, 338, 349, 389, 400, 401; 709/238, 249; 714/748, 749

(56) References Cited

U.S. PATENT DOCUMENTS

| | | | |
|---|---|---|---|
| 5,570,367 A | * 10/1996 | Ayanoglu et al. | 370/94.1 |
| 5,572,528 A | * 11/1996 | Shuen | 370/85 |
| 5,737,328 A | * 4/1998 | Norman et al. | 370/331 |
| 5,793,762 A | * 8/1998 | Penners et al. | 370/389 |
| 6,061,650 A | * 5/2000 | Malkin et al. | 704/228 |
| 6,094,424 A | * 7/2000 | Kalmanek et al. | 370/328 |

OTHER PUBLICATIONS

Balakrishnan, Hari, et al., "A Comparsion of Mechanisms for Improving TCP Performance over Wireless Links", Dec. 1997, IEEE/ACM Transactions on Networking, vol. 5, No. 6, pp. 756–769.

Laurens, Roy, et al., Simulation and Performance Analysis of Internet Protocols Over Acts, May 1999, Carnegie Mellon University, Information Networking Institute, pp. 105.

* cited by examiner

*Primary Examiner*—Thanh Cong Le
*Assistant Examiner*—James Ewart
(74) *Attorney, Agent, or Firm*—Beyer, Weaver & Thomas, LLP.; Mary R. Olynick, Esq.

(57) ABSTRACT

In a router or packet processing node supporting Mobile IP, a method for causing packets to be retransmitted from a sender to a mobile node is disclosed. A plurality of packets having associated update information are received. The packets are intended for the mobile node. The update information associated with at least one of the received packets is stored. When the mobile node is disconnected from the sender and reconnects to the sender, without waiting for a timeout the sender is directed to retransmit a last portion of packets to the mobile node based on the stored update information. Apparatus and computer readable medium embodiments are also disclosed.

35 Claims, 7 Drawing Sheets

NETWORK LAYER SUPPORT TO ENHANCE THE TRANSPORT LAYER PERFORMANCE IN MOBILE AND WIRELESS ENVIRONMENTS

BACKGROUND OF THE INVENTION

1. Field of the Invention

The present invention relates to Mobile IP network technology. More particularly, the present invention relates to Mobile IP inter- and intra-agent mobility.

2. Description of the Related Art

Mobile IP is a protocol which allows laptop computers or other mobile computer units (referred to as "Mobile Nodes" herein) to roam between various sub-networks at various locations—while maintaining Internet and/or WAN connectivity. Without Mobile IP or similar protocol, a Mobile Node would be unable to stay connected while roaming through various sub-networks. This is because the IP address required for any node to communicate over the Internet is location specific. Each IP address has a field that specifies the particular sub-network on which the node resides. If a user desires to take a computer which is normally attached to one subnetwork and roam with it so that it passes through different sub-networks, it cannot use its home base IP address. As a result, a business person traveling across the country cannot merely roam with his or her computer across geographically disparate network segments or wireless nodes while remaining connected over the Internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1:
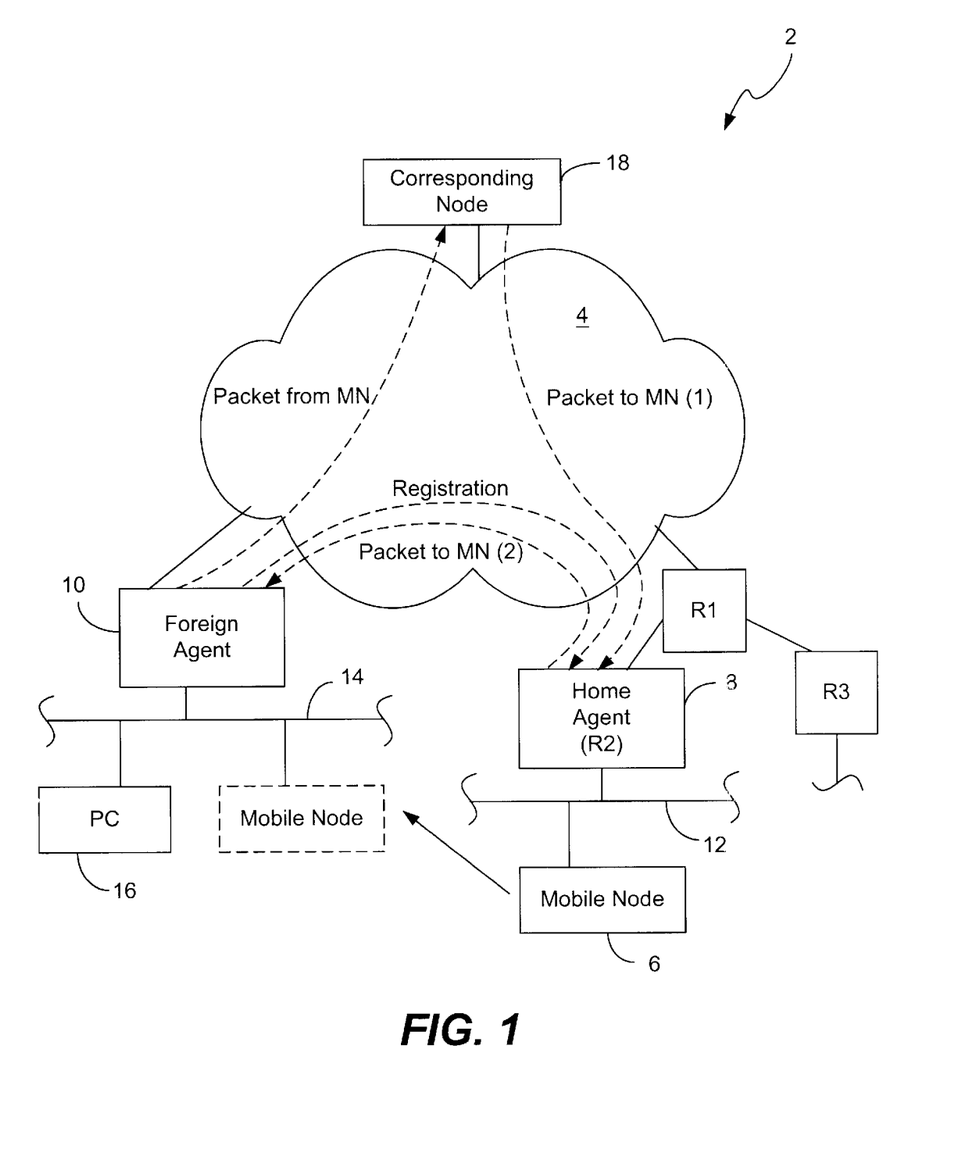
FIG. 1 is a diagram of a Mobile IP network segment and associated environment permitting inter-agent mobility.

The Mobile IP process and environment are illustrated in FIG. 1. As shown there, a Mobile IP environment 2 includes the Internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the Internet through its designated Home Agent. When the Mobile Node roams, it communicates via the Internet through an available Foreign Agent. Presumably, there are many Foreign Agents available at geographically disparate locations to allow wide spread Internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the Internet 4 using a standard router. Of course, this standard router may also implement Home Agent/Foreign Agent functionality when needed. Note that Home Agent 8 need not directly connect to the Internet. For example, as shown in FIG. 1, it may be connected through another router (a router R1 in this case). Router R1 may, in turn, connect one or more other routers (e.g., a router R3) with the Internet.

Now, suppose that Mobile Node 6 is removed from its home base network segment 12 and roams to a remote network segment 14. Network segment 14 may include various other nodes such as a PC 16. The nodes on network segment 14 communicate with the Internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node is given a new IP address to be able to receive and/or send information on segment 14.

Now, suppose that Mobile Node 6 wishes to send a message to a corresponding node 18 from its new location. A message from the Mobile Node is then packetized and forwarded through Foreign Agent 10 over the Internet 4 and to corresponding node 18 (as indicated by the dotted line "packet from MN") according to a standard Internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the Internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

As described above, a mobile node typically roams from its Home Agent on one router to a Foreign Agent on another router. When the mobile node disconnects from its Home Agent, a node that is sending packets to the mobile node will not receive an expected acknowledgement from the mobile node for a set of packets. As a result, the transmitting node will retransmit the set of packets to the mobile node through the Home Agent after a predefined period of time (or timeout period). This retransmission typically only occurs on a connection-oriented or reliable transport layer, such as TCP. If there is still no reply, the transmitting node attempts again to retransmit the set of packets, but after a longer predefined period of time. The transmitting node will keep trying to send the set of packets to the mobile node at ever increasing time intervals.

When the mobile node finally reconnects to a foreign agent and registers its new address (or reconnects to the same agent), the mobile node will have to wait a significant amount of time for packets to be resent by the transmitting node. That is, the mobile node must wait for the predefined time interval to expire before the transmitting node retransmits the packets.

In view of the above, it would be desirable to enable a mobile node to reestablish communication with a transmitting node after disconnecting from and reconnecting to such transmitting node without experiencing a significant delay in receiving packets.

SUMMARY OF THE INVENTION

Accordingly, the present invention provides an apparatus and method for triggering retransmission of packets that were sent by a sending node to a mobile node while the mobile node was temporarily cutoff from such sending node. In general terms, a portion of one or more packets and/or their associated headers is buffered as update information. This buffered update information can later be used to trigger retransmission of packets that were not received by a temporarily disconnected mobile node. This retransmission is triggered before the timeout period is reached (e.g., the buffered update information is used to trigger almost immediate resumption of transmission). For example, the last packet may be buffered as update information. When the mobile node disconnects and then reconnects to the network, the last packet can then be immediately sent to the mobile node. The mobile node will then respond to that last packet by informing the sending node whether or not any packets (e.g., that were sent prior to the last packet) failed to reach the mobile node. In another example, the update information can be used to directly notify the sending node whether any packets have failed to reach the mobile node.

In one embodiment, in a packet processing node supporting Mobile IP, a method for causing packets to be retransmitted from a sender to a mobile node is disclosed. A plurality of packets having associated update information are received. The packets are intended for the mobile node. The update information associated with at least one of the received packets is stored. When the mobile node is disconnected from the sender and reconnects to the sender, the sender is directed to retransmit a last portion of packets to the mobile node based on the stored update information.

In another embodiment, a router supporting Mobile IP for use with a mobile node to cause packets to be retransmitted from a sender to a mobile node is disclosed. The router includes a memory and a processor coupled to the memory. At least one of the memory and the processor are adapted to provide receiving a set of packets having associated update information to the router. The packets are intended for the mobile node. The at least one memory and processor are also adapted to provide sending the update information associated with at least one of the received packets and when mobile node is disconnected from the sender and reconnects to the sender, directing the sender to retransmit a last portion of the packets to the mobile node based on the stored update information.

In one embodiment, the sender is directed to retransmit the last portion of the packets by sending a message to the sender of the packets based on the update information. In a specific embodiment, the message is an acknowledgement (ACK) indicating which packet from the sender was received last by the mobile node prior to disconnecting. In another specific embodiment, the message is a nonacknowlegement (NAK) indicating one or more packets from the sender that were not received by the mobile node. In a further embodiment, the update information includes a source address, a destination address, and a sequence number.

In another embodiment, the sender is directed to retransmit the last portion of the packets by sending a trigger packet to the mobile node such that the mobile node will direct the sender to retransmit the last portion of packets. In a preferred embodiment, the trigger packet is a last packet within the portion of packets not received by the mobile node.

In another aspect, the invention pertains to a computer readable medium containing programming instructions for causing packets to be retransmitted from a sender to a mobile node. The computer readable medium includes computer code for receiving a plurality of packets having associated update information, the packets being intended for the mobile node and computer code for storing the update information associated with at least one of the received packets. The computer readable medium further includes computer code for when mobile node is disconnected from the sender and reconnects to the sender, directing the sender to retransmit a last portion of the packets to the mobile node based on the stored update information.

The present invention has several advantages. For example, since retransmission may be triggered as soon as a mobile node reconnects to a router, the mobile node does not have to wait long to receive missed packets, as compared to the conventional setup where the mobile node has to wait for the sending node to retry packet transmission after a predetermined period of time. Instead, the mobile node can trigger retransmission immediately after the mobile node completes reconnection.

In preferred embodiments, the retransmission triggering mechanisms are implemented independently of the transport layer of the mobile node and the sending node. In other words, the transport layer does not have to be modified to trigger retransmission of missing packets. That is, the transport layer (e.g., TCP layer) is already configured to respond to particular messages or packets from the network layer (e.g., IP layer) thereby triggering a retransmission of missing packets. An appropriate message or packet merely has to be sent to the transport layer of the mobile node or sending node to trigger retransmission. For example, when a packet having a sequence number that is more than one greater than the packet that was last received by the mobile node is sent to the mobile node, the transport layer of the mobile node then responds by telling the sending node to retransmit the missing packets.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, one or more of the nodes (referred to as a "buffering node) in the network stores "update information" (e.g., a source address, a destination address, and a packet sequence number) regarding at least one of the lastly transmitted packets for a transport session (e.g., TCP) between a sending node and a receiving node. This update information may also be buffered while the receiving node is unable to receive packets from the sending node. Once a handoff is completed (e.g., the receiving node disconnects from and reconnects to an agent) or a disabled link is back up, the buffering node can then almost immediately trigger retransmission of any missed packets based on the buffered update information. For example, a message may be sent to the sending node indicating which packets were not received by the receiving node (e.g., a NAK is sent for missing packets). The message may alternatively indicate which packets reached the receiving node (e.g., an ACK response is sent for the last received packet).

Instead of buffering only update information about the received packets, the entire packet may also be stored. The stored last packet may also be used to trigger a retransmission of missed packets. For example, the last packet is sent to the receiving node after it reconnects. The receiving node on receipt of this packet either sends an ACK or an NACK for the packet it did not receive to the sending node. Whether or not the receiving node sends an ACK or a NACK depends on the sequence number of the packet. This communication triggers the retransmission.

Mechanisms for buffering update information or packets and triggering retransmission may be implemented in one or more components within the network (e.g., network 2 of FIG. 1). For example, any of the routers that handle data transmitted between the sender and the receiver node may also implement buffering and/or retransmission triggering. Preferably, buffering and triggering mechanisms are implemented by the mobile node's home agent. Buffering and/or triggering mechanisms may also be implemented by any foreign agent or the mobile node itself. Alternatively, buffering and/or triggering mechanisms may be implemented by a personal computer coupled to the home agent or foreign agent. The buffering may also be distributed over several nodes or routers.

The present invention may be implemented during any suitable communication session. For example, update information may be continuously stored as packets are received at a particular router for a particular mobile node. The mobile node may be in communication with any number of nodes at one time. Thus, update information may be stored per session or flow. A Sending Node that is transmitting packets to a particular Receiving Mobile Node may have to be directed to retransmit for any number of reasons. For example, the Receiving Mobile Node may have disconnected and reconnected to the same node (e.g., home agent or foreign agent). By way of another example, the Receiving Mobile Node may have disconnected from a first agent and reconnected to a second agent.

Figure 2A:
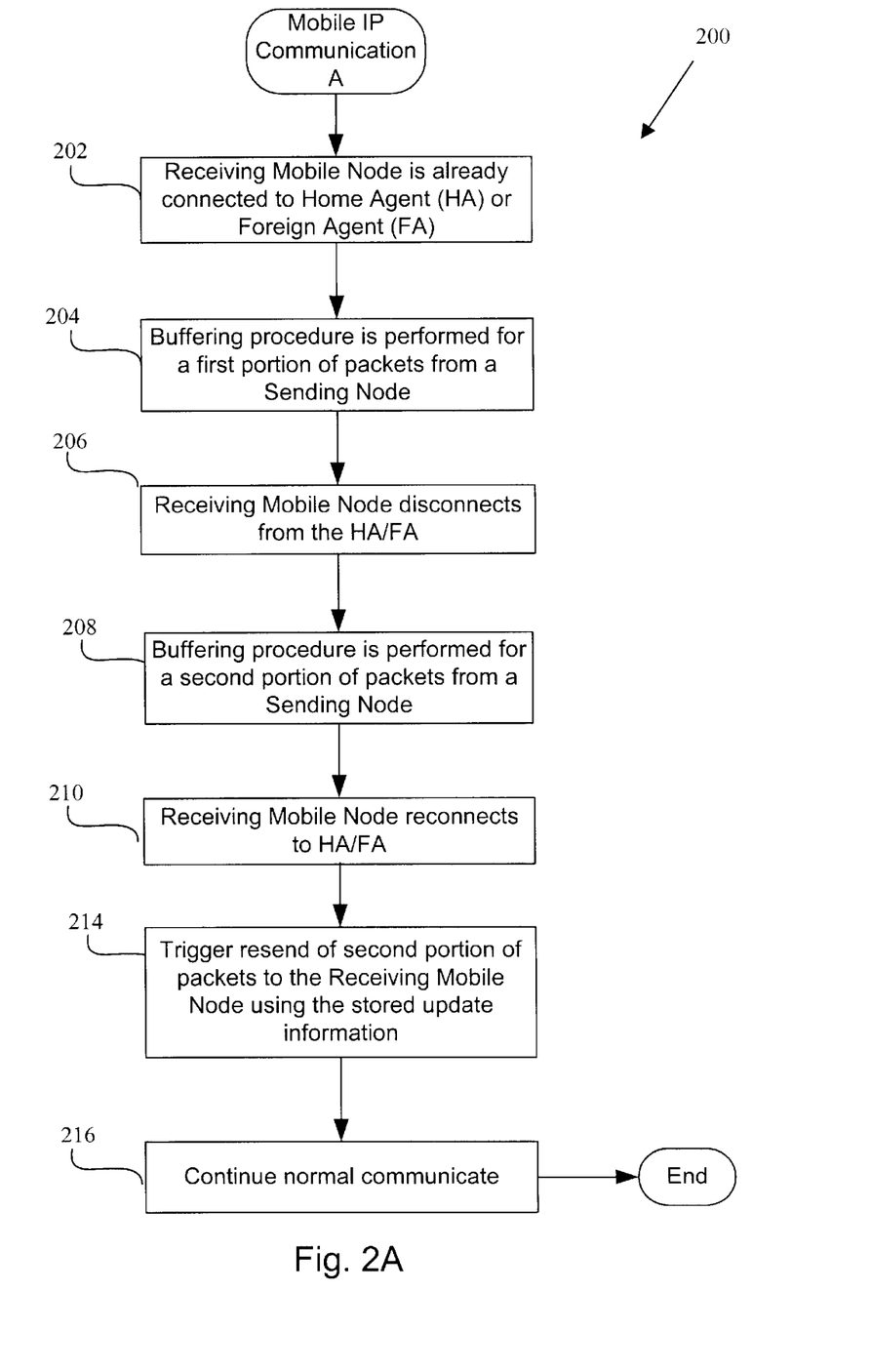
FIG. 2A is a flowchart illustrating a first communication sequence between a Receiving Mobile Node and a Sending Node in accordance with one embodiment of the present invention.
Figure 2B:
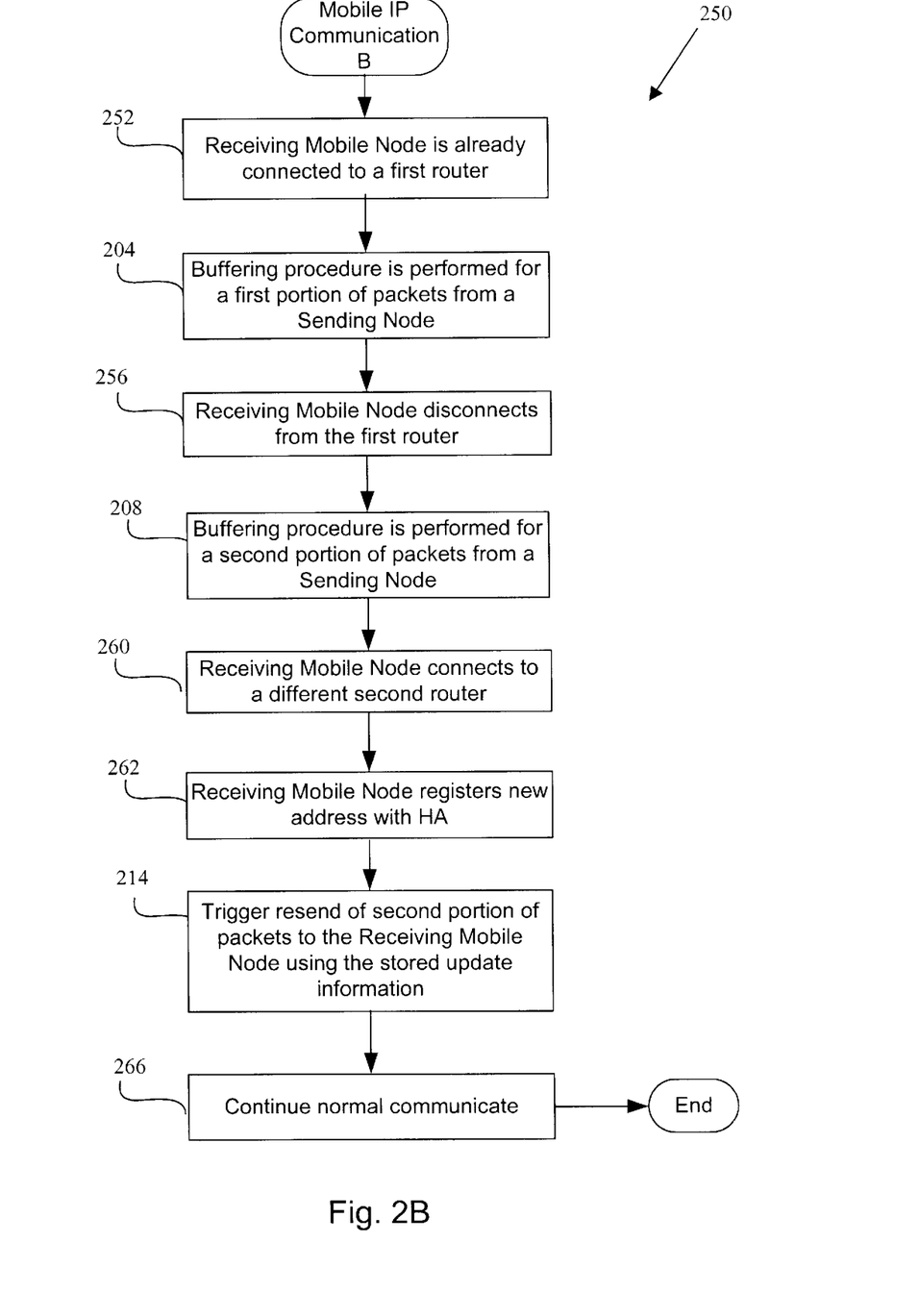
FIG. 2B is a flowchart illustrating a second communication sequence between the Receiving Mobile Node and the Sending Node in accordance with an alternative embodiment of the present invention.

FIGS. 2A and 2B illustrate two possible communication sequences between a Sending Node and a Receiving Mobile Node. Although the events within these sequences are serially represented, of course, one or more events may occur in parallel with one or more other events. For example, update information may be continuously buffered for each flow within a background process as each packet is received.

FIG. 2A is a flowchart illustrating a first communication sequence 200 between a Receiving Mobile Node and a Sending Node in accordance with one embodiment of the present invention. This communication sequence illustrates an example of what may occur when the Receiving Mobile Node disconnects from and reconnects to the same agent. For example, the Receiving Mobile Node disconnects from a particular foreign agent and reconnects to the same foreign agent.

Initially, the Receiving Mobile Node is already connected to either its Home Agent (HA) or to a Foreign Agent (FA) in block 202. In block 204 a buffering procedure is then performed for a first portion of packets that are transmitted from the Sending Node to the Receiving Mobile Node. This buffering procedure generally includes saving parameters from the received packet and/or packet headers that may used later to trigger the Sending Node to retransmit the packets. Several embodiments for triggering a retransmission of one or more packets are described below with reference to FIGS. 4A and 4B.

In this example, the Receiving Mobile Node then disconnects from the HA or FA in block 206. In other words, the Receiving Mobile Node is temporarily disconnected from the Sending Node. The Receiving Mobile Node may be disconnected from the HA or FA or there may be a break within the communication link between the HA or FA and the Sending Node. For example, an intermediate router that normally directs traffic between the router that is directly coupled to the Sending Node and the router that is directly coupled with the Receiving Mobile Node (i.e., the HA or FA) is unable to forward such traffic.

After the Receiving Mobile Node disconnects, the buffering procedure is performed for a second portion of packets received in the HA or FA from the Sending Node in block 208. In this example, the Receiving Mobile Node then reconnects to the Sending Node in block 210. Retransmission of the second portion of packets is then triggered in block 214. This trigger mechanism is accomplished using information that was buffered in block 208.

Normal communication between the Receiving Mobile Node and the Sending Node may then continue in block 216. For example, once the session is reestablished by retransmitted the missing second packets, the Sending Node may send other packets to the Receiving Mobile Node, or vice versa.

FIG. 2B is a flowchart illustrating a second communication sequence 250 between the Receiving Mobile Node and the Sending Node in accordance with an alternative embodiment of the present invention. During this communication, the Receiving Mobile Node disconnects from a first router and reconnects to a different router. For example, the Receiving Mobile Node moves from the HA's router to a FA router. By way of another example, the Receiving Mobile Node moves from a first FA to a second FA.

Initially, the Receiving Mobile Node is already connected to a first router in block 252. The buffering procedure is performed on a first portion of packets in block 204. The Receiving Mobile Node then disconnects from the first router in block 256, and the buffering procedure is performed on a second portion of packets in block 208.

The Receiving Mobile Node then connects to a different second router in block 260. For example, the Receiving Mobile Node moves from its HA to an FA, from FA1 to FA2, or from an FA back to its HA. The Receiving Mobile Node then registers its new address with its HA in block 262. Any suitable registration protocol may be implemented (e.g., the registration procedure described above with reference to FIG. 1).

Retransmission of the second portion of packets is then triggered in block 214 based on buffered information. Normal processing then continues in block 266. For the case where buffering and triggering mechanisms are implemented by the home agent and when the mobile node registers a new address with the home agent, the home agent may then respond to registration by triggering retransmission of the missing packets. When buffering and triggering mechanisms are implemented within the foreign agent, the foreign agent knows when to trigger retransmission because it receives a binding update message from a new foreign agent. The new foreign agent knows the location of the old foreign agent because the mobile node will inform it.

Figure 3:
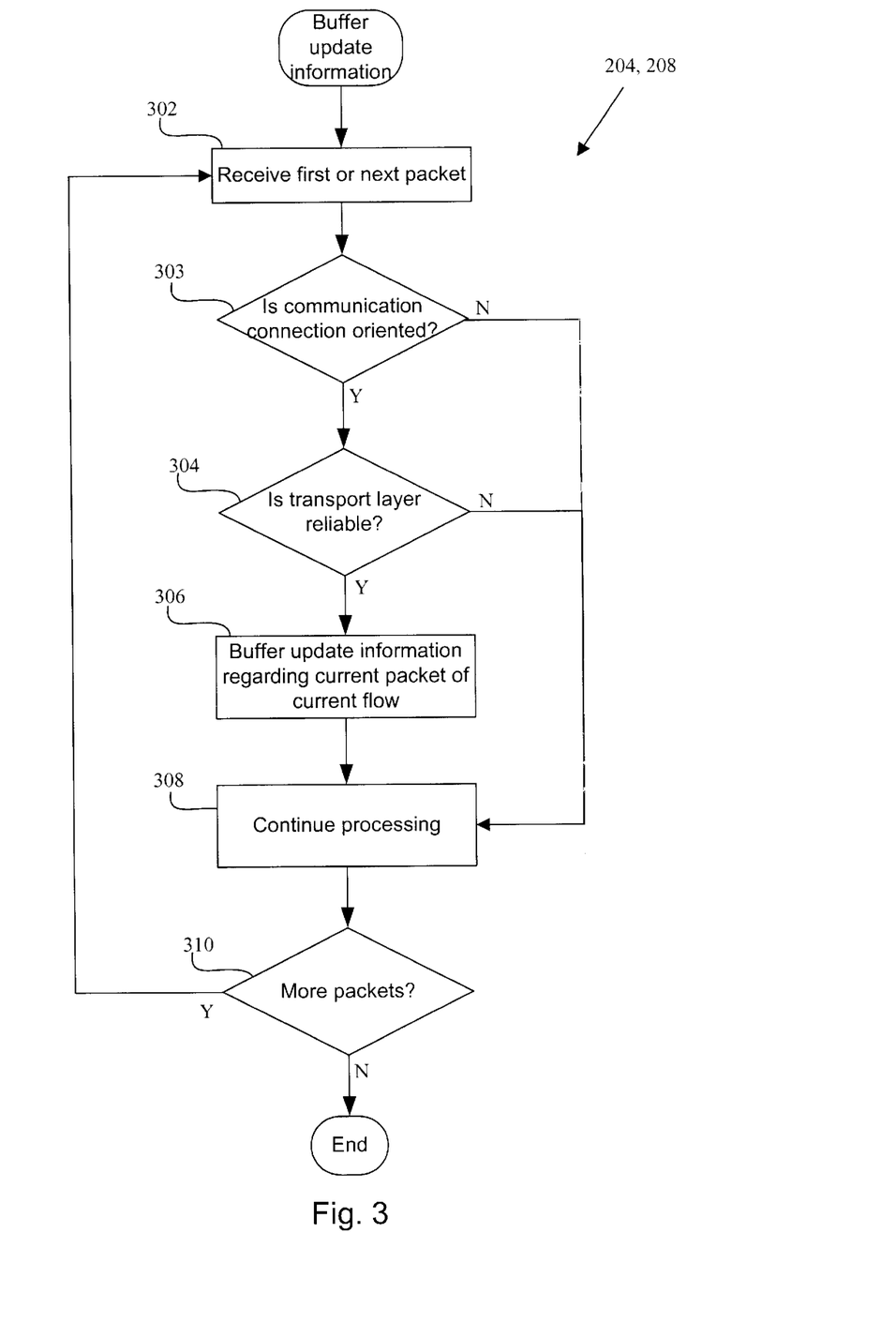
FIG. 3 is a flowchart illustrating the procedure of buffering update information in accordance with one embodiment of the present invention.

FIG. 3 is a flowchart illustrating the blocks 204 and 208 of FIGS. 2A and 2B, respectively, of buffering update information in accordance with one embodiment of the present invention. In general terms, update information is stored for one or more packets that were most recently transmitted. The update information generally includes information that may be relevant for triggering a retransmission of any packets that were not received by the Receiving Mobile Node.

The buffering procedure may be implemented in any suitable manner such that update information is buffered for at least one of the most recently transmitted packet(s). In one embodiment, the buffering procedure is a continuous process that buffers update information for each newly received packet. Old update information may be overwritten by the newly received update information. Thus, update information is stored for at least the last received packet. Alternatively, update information may be kept for several packets. The amount of update information that is stored depends on the available amount of memory space, processing power, number of mobile nodes handled, company or organization policy, etc. For example, if there is enough memory space, all of the packets received after the mobile node disconnects may be buffered. These buffered packets can then be directly transmitted to the mobile node when it reconnects to the network. It has been found that buffering 10 seconds of a packet stream works well to store substantially all of the packets that are dropped before a disconnection is detected.

Initially, the first packet is received in block 302. It is then determined whether the received packet or flow of that packet is connection oriented in block 304. Any suitable mechanism may be utilized for determining whether the flow is connection oriented. For example, it may be determined whether the packet includes a sequence number. Packets with sequence numbers allow tracking of which packets are received by the Receiving Mobile Node and which packets are lost. For example, the Receiving Mobile Node may receive packets numbered 1 and 2. If the Receiving Mobile Node then receives a packet numbered as 4, the Receiving Mobile Node then knows that packet 3 was lost.

If the flow is connection oriented, it then determined whether the transport layer is reliable in block 304. The transport layer is reliable, for example, when the transport layer is capable of triggering retransmission of packets and/or responding to attempts to trigger retransmission. In other words, the transport layer is capable of directing a retransmission of packets. If the flow is connection oriented and the transport later is reliable, update information is then stored regarding the flow in block 306. Otherwise, block 306 may be skipped.

Any suitable update information may be stored that may be relevant for triggering the retransmission of packets within the transport layer. For example, the update information may include the source address, the destination address, the sequence number, and the acknowledgement number. The source address may be in the form of a source IP address and a source port address. Likewise, the destination address may be in the form of a destination IP address and a destination port address. By way of another example, the update information may be in the form of a TCP header. The update information may also specify the protocol type of the received packets.

The sequence number specifies the transmission order of a block of packets.

For example, a block of fifty packets may be numbered as packets 1 through 50. The acknowledgement number indicates the sequence number of the packet that was last received by the receiving node and acknowledged to the sender. The acknowledgement number may be later utilized to determine the last contiguous packet that was received and acknowledged by the sender. For example, if packets 1,2,3,7,8,9 are received, the receiving node sends an acknowledgement number of 3 to the sender. The packet(s) that follow this last acknowledged packet need to then be retransmitted.

After the update information is buffered, processing continues in block 308. For example, the packet is routed to its intended destination. It is then determined whether there are more packets in block 310. If there are more packets, a next packet is received in block 302 and the buffering procedure is repeated for this next packet. After the last packet within the block of packets is processed, the buffering process is suspended until a next group of packets arrives.

This buffered update information may then be used to trigger retransmission of packets that were sent by the Sending Node, but not received by the Receiving Mobile Node. That is, the Receiving Mobile Node may have missed packets while being disconnected from the network, for example. The update information may be used to send a message to the Sending Node instructing the Sending Node that it should retransmit the missing packets. One embodiment of this triggering mechanism is described below in reference to FIG. 4B. Alternatively, the update information may be used to send an "out of sequence" packet to the Receiving Mobile Node such that the Receiving Mobile Node then asks the Sending Node for any missing packets (e.g., see FIG. 4A).

Figure 4A:
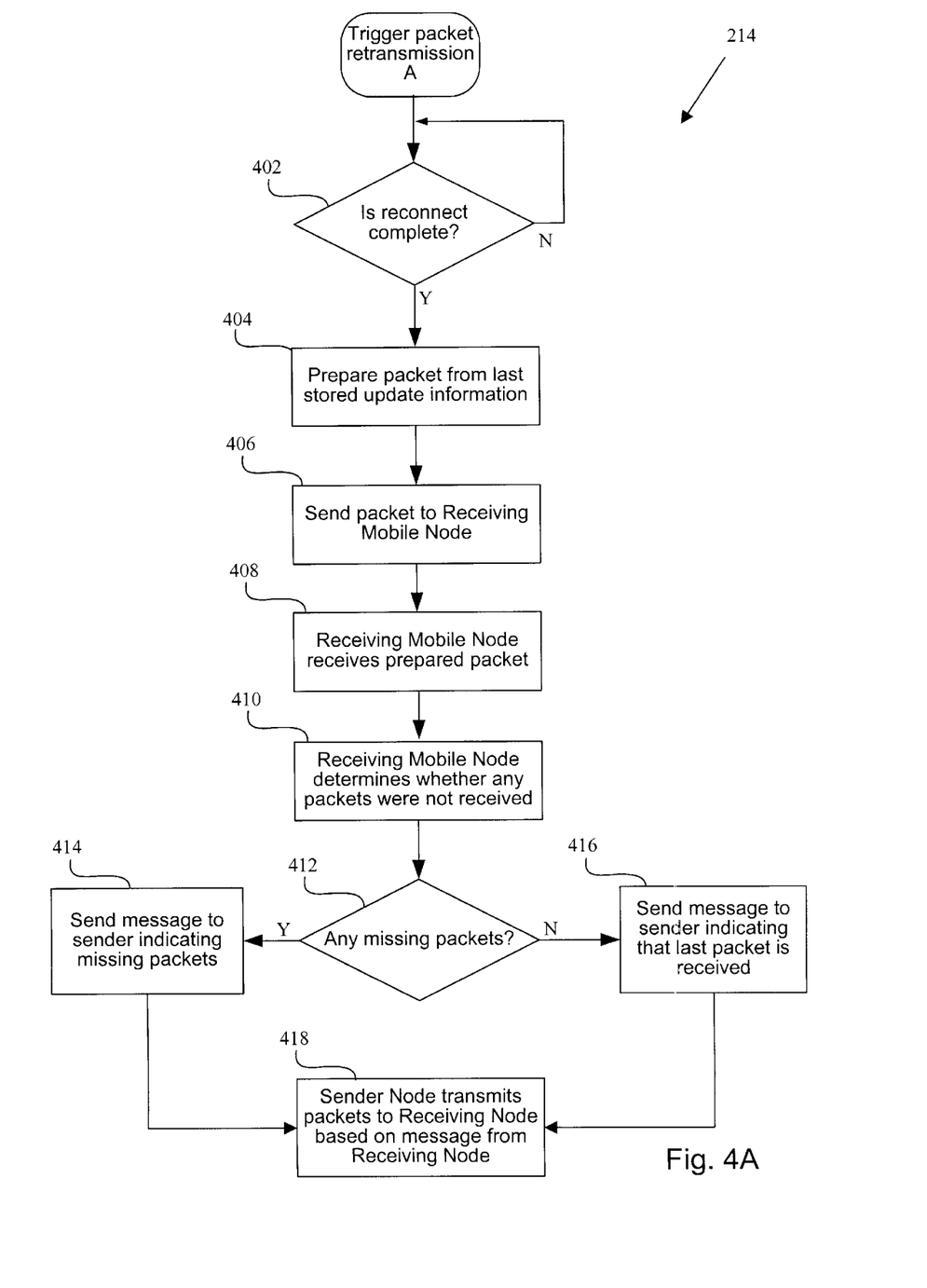
FIGS. 4A is a flowchart illustrating the process of triggering retransmission of missed packets in accordance with one embodiment of the present invention.

FIG. 4A is a flowchart illustrating the block 214 of FIG. 2A of triggering retransmission of missed packets in accordance with one embodiment of the present invention. Initially, it is determined whether the Receiving Mobile Node has completed reconnection in block 402. As described above, the Receiving Mobile Node may disconnect and reconnect in any manner. For example, the Receiving Mobile Node may disconnect from its HA and reconnect to a FA. By way of another example, the Receiving Mobile Node may disconnect from a first FA and reconnect to another FA. By way of another example, the Receiving Mobile Node may disconnect from any particular agent (e.g., its HA or FA) and reconnect to the same agent. The Receiving Mobile Node may also be disconnected when the link between the Receiving Mobile Node and the Sending Node is temporarily disabled.

After the Receiving Mobile Node reconnects, a packet is prepared from the last stored update information in block 404. The packet is then sent to the Receiving Mobile Node in block 406. In one embodiment, the last received packet may be sent to the mobile node so that the transport layer of Receiving Mobile Node, in response to the last packet, automatically informs the Sending Node of missing packets.

Turning back to FIG. 4A, after the prepared packet is received by the Receiving Mobile Node in block 408, the Receiving Mobile Node then may determine whether any packets were not received. That is, the Receiving Mobile Node may determine which packets were sent to the Receiving Mobile Node while the Receiving Mobile Node was disconnected from the Sending Node.

For example, if the Receiving Mobile Node has already received packets 1 and 2 before disconnecting from the Sending Node and the Receiving Mobile Node receives packet 5 after reconnecting, the Receiving Mobile Node knows that packets 3 and 4 are missing. The Receiving Mobile Node may then send a request to the Sending Node that packets 3 and 4 be retransmitted.

If there are missing packets (block 412), the Receiving Mobile Node sends a message to the Sending Node indicating that there are missing packets in block 414. In other words, the Receiving Mobile Node requests that the Sending Node retransmit the missing packets. Otherwise, if there are no missing packets, a message may be sent to the Sending Node acknowledging receipt of the last packet.

Thus, in block 418 the Sending Node may restart sending packets based on the message from the Receiving Mobile Node. If the message indicates missing packets, the Sending Node may retransmit the missing packets. If the message acknowledges receipt of the last packet, the Sending Node may then send more packets (previously not transmitted). Normal communication may then be reestablished between the Sending Node and the Receiving Mobile Node in block 216 of FIG. 2A or block 266 of FIG. 2B.

Figure 4B:
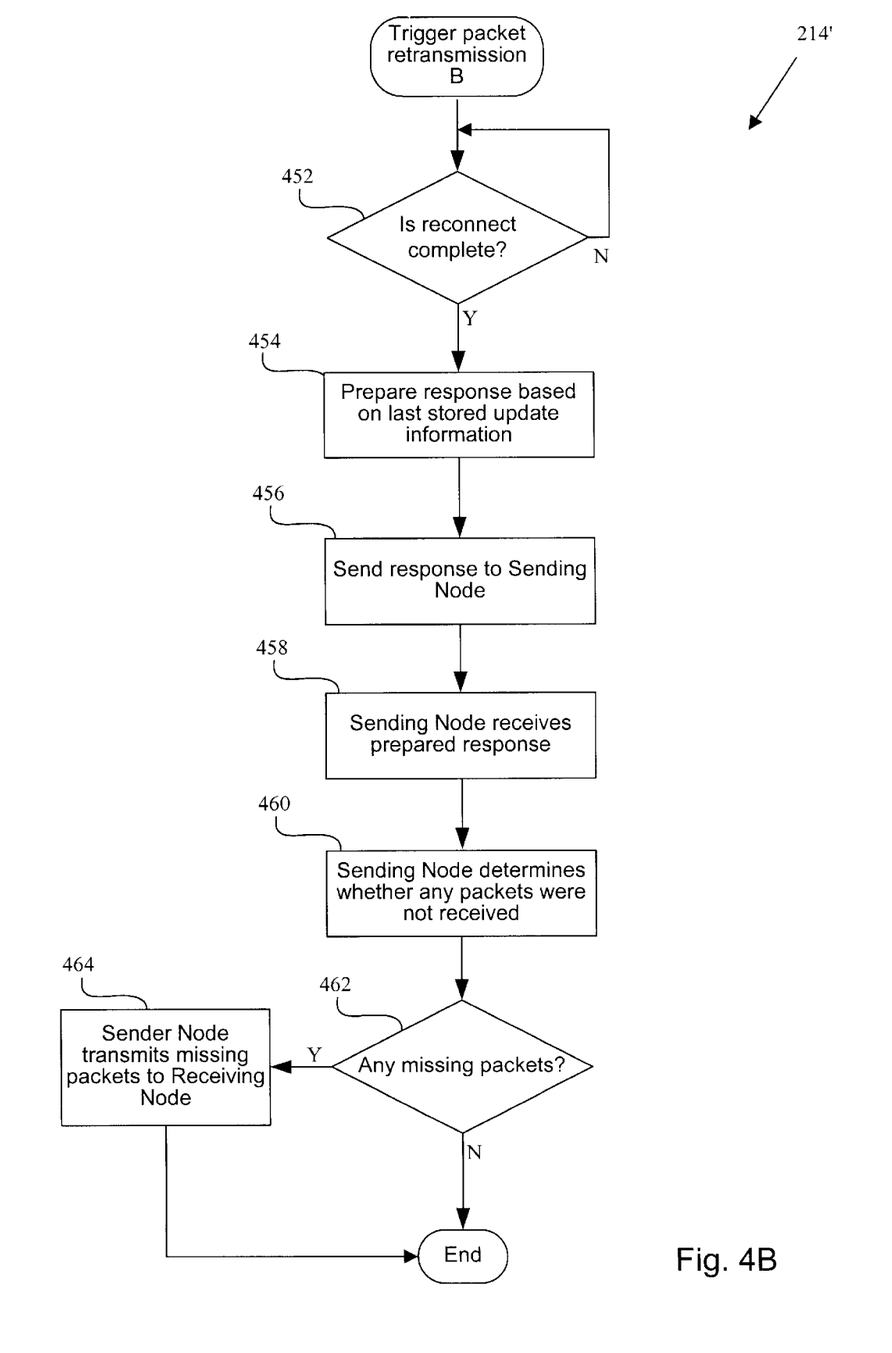
FIG. 4B is a flowchart illustrating an alternative mechanism for triggering retransmission of missing packets.

FIG. 4B is a flowchart illustrating an alternative mechanism for triggering retransmission of missing packets. After the Receiving Mobile Node is reconnected (block 452), a response is prepared based on the buffered update information in block 454. For example, an acknowledgement (ACK) response may be prepared to indicate which packet was last received by the mobile node. Alternatively, a nonacknowledgement (NAK) response may be prepared to indicate which packets should be resent to the Receiving Mobile Node. The prepared response is then sent to the Sending Node in block 456.

The response may be prepared and/or sent by any suitable source. For example, the response may be prepared and sent by the buffering node (e.g., the home agent). By way of other examples, the prepared response may be sent by the mobile node or the foreign agent.

After the response is sent to the Sending Node, the Sending Node may then determine whether any packets have not been received by the Receiving Mobile Node based on the Receiving Mobile Node response in block 458. For example, the Sending Node may receive a NAK response indicating that packets 5–7 have not been received. If there are missing packets (as determined in decision block 462), the Sending Node may then retransmit the missing packets to the Receiving Mobile Node in block 464. Normal communication may then recommence between the Sending Node and the Receiving Mobile Node.

The present invention has several advantages. For example, the performance of transport protocols and mobile and wireless environments is significantly improved when transmission of packets can be quickly restarted when a mobile node reconnects to the network. Specifically, the present invention can be used to improve the performance of TCP in mobile IP environment.

Figure 5:
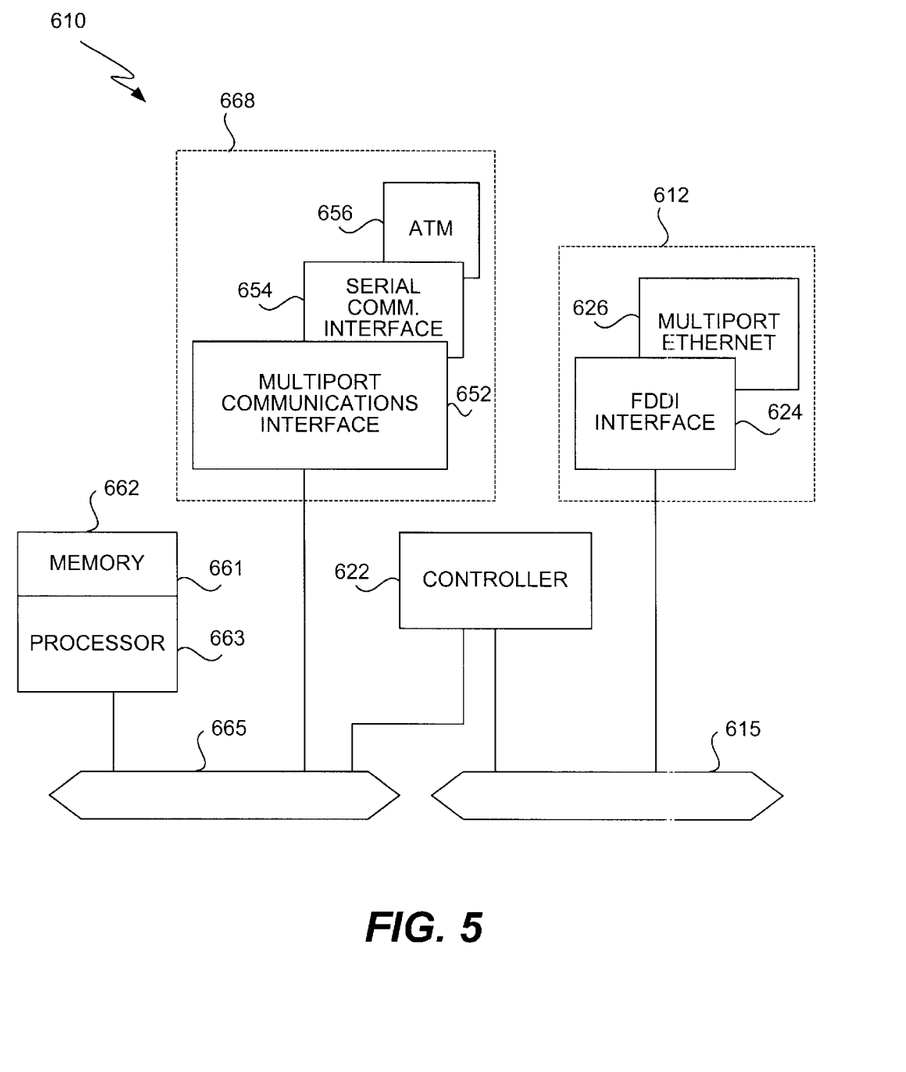
FIG. 5 is a diagrammatic representation of a router for implementing the process of FIGS. 3 and 4 in accordance with one embodiment of the present invention.

The above-described processes 200 and 250 may be implemented within any suitable component or combination of components on the network. For example, portions of the processes 200 and 250 may be implemented within the home agent and/or within a foreign agent and/or within the mobile node itself. In one embodiment, much of the processes 200 and 250 are implemented on a router as shown in FIG. 5. Referring now to FIG. 5, a router 610 of the present invention includes a master central processing unit (CPU) 662, low and medium speed interfaces 668, and high speed interfaces 612. In preferred embodiments, the CPU 662 is responsible for such router tasks as routing table computations and network management. It may include one or more microprocessor chips 663 selected from complex instruction set computer (CISC) chips, reduced instruction set computer (RISC) chips, or other available chips. In a preferred embodiment, non-volatile RAM and/or ROM 661 also form part of CPU 662. However, there are many different ways in which memory could be coupled to the system.

The interfaces 612 and 668 are typically provided as interface cards. Generally, they control the sending and receipt of data packets over the network and sometimes support other peripherals used with the router 610. The low and medium speed interfaces 668 include a multiport communications interface 652, a serial communications interfaces 654, and an asynchronous transfer mode (ATM) interface 656. The high speed interfaces 612 include an FDDI interface 624 and a multiport ethernet interface 626. Preferably, each of these interfaces (low/medium and high speed) includes (1) a plurality of ports appropriate for communication with the appropriate media, and (2) an independent processor and in some instances (3) volatile RAM. The independent processors control such communications intensive tasks as packet switching and filtering, and media control and management. By providing separate processors for the communications intensive tasks, this architecture permits the master microprocessor 662 to efficiently perform routing computations, network diagnostics, security functions, etc.

The low and medium speed interfaces are coupled to the master CPU 662 through a data, control, and address bus 665. High speed interfaces 612 are connected to the bus 665 through a fast data, control, and address bus 615 which is in turn connected to a bus controller 622. The bus controller functions are provided by a processor.

Although the system shown in FIG. 5 is a preferred router of the present invention, it is by no means the only router architecture on which the present invention can be implemented. For example, an architecture having a single processor that handles communications as well as routing computations, etc. would also be acceptable. Further, other types of interfaces and media could also be used with the router.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, it is also possible to have a more sophisticated method of informing the Sending Node that the handoff or linkup has occurred, and to resume normal communication (instead of uploading as in a congested network). This can be achieved by adding a new mode in the transport protocol to bypass mechanisms such as slow start. The mobile node can buffer the packets and send them when the handoff is complete.

The buffering and triggering mechanisms of the present invention may be applied to any suitable forwarding mechanism. For example, these mechanisms may be implemented along with route optimization mechanisms. Route optimization mechanisms generally notify the sending node of a new address (e.g., a foreign agent) of the receiving mobile node (e.g., via a binding update message) so that the sending node may send packets directly to the mobile node, instead of through the mobile node's home agent. Several embodiments are described in Simulation and Performance Analysis of Internet Protocol over ACTS by Roy Laurens available at Carnegie Mellon University, which is incorporated herein in its entirety. In this application, when a retransmission is triggered, the sending node is also notified of the mobile node's new address, if any. Also, the old address (e.g., foreign agent) may send or be directed to send packets received after the mobile node disconnects from the old address to the new address (e.g., a new foreign agent) of the mobile node.

Accordingly, the present embodiments are to be considered as illustrative and not restrictive, and the invention is not to be limited to the details given herein, but may be modified within the scope and equivalents of the appended claims.

What is claimed is:

1. In a packet processing node supporting Mobile IP, a method for causing packets to be retransmitted from a sender to a mobile node, the method comprising:
   receiving a plurality of packets having associated update information, the packets being intended for the mobile node;
   storing the update information associated with at least one of the received packets; and
   when mobile node is disconnected from the sender and reconnects to the sender, without waiting for a timeout directing the sender to retransmit a last portion of packets to the mobile node based on the stored update information.

2. A method as recited in claim 1 wherein the sender is directed to retransmit the last portion of packets by sending a message to the sender of the packets based on the update information.

3. A method as recited in claim 2 wherein the message is an acknowledgement (ACK) indicating which packet from the sender was received last by the mobile node prior to disconnecting.

4. A method as recited in claim 2 wherein the message is a nonacknowledgement (NAK) indicating one or more packets from the sender that were not received by the mobile node.

5. A method as recited in claim 1 wherein the sender is directed to retransmit the last portion of packets by sending a trigger packet to the mobile node such that the mobile node will direct the sender to retransmit the last portion of packets.

6. A method as recited in claim 5 wherein the trigger packet is a last packet within the portion of packets not received by the mobile node.

7. A method as recited in claim 6 wherein the stored update information is the last packet within the last portion of packets.

8. A method as recited in claim 1 wherein the sender is directed to retransmit the last portion of the packets in response to the mobile node disconnecting from a first router and registering from a different second router.

9. A method as recited in claim 8 wherein the first router is a home agent of the mobile node and the different second router is a foreign agent.

10. A method as recited in claim 8 further comprising informing the sending node of the mobile node's new address.

11. A method as recited in claim 10 further comprising directing the first router from which the mobile node disconnects to transmit packets received to the different second router to which the mobile node reconnects.

12. A method as recited in claim 1 wherein there is a break in a link between the sender and the mobile node thereby causing the mobile node to disconnect from the sender.

13. A method as recited in claim 1 wherein the update information includes a source address, a destination address, and a sequence number.

14. A method as recited in claim 13 wherein the update information further includes an acknowledgement number.

15. A method as recited in claim 1 further comprising determining whether a communication between the mobile node and the sender is connection oriented, wherein the update information is only stored and the sender is only directed to retransmit the last portion of packets when it is determined that the communication is connection oriented.

16. A method as recited in claim 15 further comprising determining whether the packets include sequence numbers, wherein the update information is only stored and the sender is only directed to retransmit the last portion of packets when it is also determined that the packets include sequence numbers.

17. A method as recited in claim 1 further comprising determining whether a transport layer of the sender can retransmit packets, wherein the update information is only stored and the sender is only directed to retransmit the last portion of packets when it is determined that the transport layer of the sender can retransmit packets.

18. A router supporting Mobile IP for use with a mobile node to cause packets to be retransmitted from a sender to a mobile node, the router comprising:
   a memory; and
   a processor coupled to the memory,
   wherein at least one of the memory and the processor are adapted to provide:
      receiving a plurality of packets having associated update information into the router, the packets being intended for the mobile node;

storing the update information associated with at least one of the received packets; and when mobile node is disconnected from the sender and reconnects to the sender, directing the sender to retransmit a last portion of the packets to the mobile node based on the stored update information.

19. A router as recited in claim 18 wherein the sender is directed to retransmit the last portion of the packets by sending a message to the sender of the packets based on the update information.

20. A router as recited in claim 19 wherein the message is an acknowledgement (ACK) indicating which packet from the sender was received last by the mobile node prior to disconnecting.

21. A router as recited in claim 19 wherein the message is a nonacknowlegemnet (NAK) indicating one or more packets from the sender that were not received by the mobile node.

22. A router as recited in claim 18 wherein the sender is directed to retransmit the last portion of the packets by sending a trigger packet to the mobile node such that the mobile node will direct the sender to retransmit the last portion of packets.

23. A router as recited in claim 22 wherein the trigger packet is a last packet within the portion of packets not received by the mobile node.

24. A router as recited in claim 23 wherein the stored update information is the last packet within the last portion of packets.

25. A router as recited in claim 18 wherein the sender is directed to retransmit the last portion of the packets in response to the mobile node disconnecting from the router and registering from a different router.

26. A router as recited in claim 25 wherein the router is a home agent of the mobile node and the different router is a foreign agent.

27. A router as recited in claim 25 wherein at least one of the memory and the processor are adapted to inform the sending node of the mobile node's new address.

28. A router as recited in claim 27 wherein at least one of the memory and the processor are adapted to direct the router from which the mobile node disconnects to transmit packets received to the different router to which the mobile node reconnects.

29. A router as recited in claim 18 wherein there is a break in a link between the sender and the mobile node thereby causing the mobile node to disconnect from the sender.

30. A router as recited in claim 18 wherein the update information includes a source address, a destination address, and a sequence number.

31. A router as recited in claim 30 wherein the update information further includes an acknowledgement number.

32. A router as recited in claim 18 wherein at least one of the memory and the processor are adapted to further provide determining whether a communication between the mobile node and the sender is connection oriented, wherein the update information is only stored and the sender is only directed to retransmit the last portion of packets when it is determined that the communication is connection oriented.

33. A router as recited in claim 32 wherein at least one of the memory and the processor are adapted to further provide determining whether the packets include sequence numbers, wherein the update information is only stored and the sender is only directed to retransmit the last portion of packets when it is also determined that the packets include sequence numbers.

34. A router as recited in claim 18 wherein at least one of the memory and the processor are adapted to further provide determining whether a transport layer of the sender can retransmit packets, wherein the update information is only stored and the sender is only directed to retransmit the last portion of packets when it is determined that the transport layer of the sender can retransmit packets.

35. A computer readable medium containing programming instructions for causing packets to be retransmitted from a sender to a mobile node, the computer readable medium comprising:

computer code for receiving a plurality of packets having associated update information, the packets being intended for the mobile node;

computer code for storing the update information associated with at least one of the received packets; and computer code for when mobile node is disconnected from the sender and reconnects to the sender, without waiting for a timeout directing the sender to retransmit a last portion of the packets to the mobile node based on the stored update information.

* * * * *